(12) United States Patent
Becker et al.

(10) Patent No.: US 7,581,789 B2
(45) Date of Patent: Sep. 1, 2009

(54) ADJUSTER DEVICE FOR ADJUSTING AND HOLDING A FIRST PART OF A VEHICLE SEAT RELATIVE TO A SECOND PART

(75) Inventors: Burckhard Becker, Solingen (DE); Alexander Mishuris, Erkrath (DE); Wilfried Beneker, Leichlingen (DE)

(73) Assignee: C. Rob. Hammerstein GmbH & Co., KG, Solingen (DE)

( * ) Notice: Subject to any disclaimer, the term of this patent is extended or adjusted under 35 U.S.C. 154(b) by 267 days.

(21) Appl. No.: 11/629,569

(22) Filed: Dec. 14, 2006

(65) Prior Publication Data
US 2008/0042036 A1    Feb. 21, 2008

(30) Foreign Application Priority Data
Sep. 8, 2003    (DE) ............... 103 41 686

(51) Int. Cl.
*A47C 7/14*    (2006.01)
(52) U.S. Cl. ............................... 297/284.11
(58) Field of Classification Search ........... 297/284.11, 297/284.9
See application file for complete search history.

(56) References Cited

U.S. PATENT DOCUMENTS

| | | | | |
|---|---|---|---|---|
| 4,693,513 A | * | 9/1987 | Heath ................ | 297/284.11 |
| 4,709,961 A | * | 12/1987 | Hill .................. | 297/284.11 |
| 5,362,128 A | * | 11/1994 | Wildern, IV ......... | 297/284.11 |
| 7,404,602 B2 | * | 7/2008 | Okada et al. ......... | 297/284.11 |
| 2001/0022460 A1 | * | 9/2001 | Kondo et al. ......... | 297/284.11 |
| 2003/0178875 A1 | * | 9/2003 | Ito et al. ............ | 297/284.11 |
| 2007/0080527 A1 | * | 4/2007 | Itoga et al. ......... | 297/284.11 X |

FOREIGN PATENT DOCUMENTS

| | | |
|---|---|---|
| DE | 44 37 539 A1 | 4/1995 |
| DE | 102 26 717 A1 | 1/2004 |

* cited by examiner

*Primary Examiner*—Rodney B White
(74) *Attorney, Agent, or Firm*—McCarter & English, LLP

(57) ABSTRACT

A seat adjuster device for setting a first part of a motor vehicle seat relative to a second part comprising a curved piece connected to the first part and having a center and a regular front face; and a support piece connected to the second part and mounted to rotate about the center, and having a first and second clamping bevel. A first clamping body is arranged between the first clamping bevel and the front face; a second clamping body is arranged between the second clamping bevel and the front face. Two elastic means are arranged between the first clamping body and the support and the second clamping body and the support piece, respectively. The first and second clamping bodies are tensioned in first and a second rotational directions, respectively, to enable them to be pressed into their corresponding clamping gap in a clamped position.

12 Claims, 6 Drawing Sheets

Figure 1:
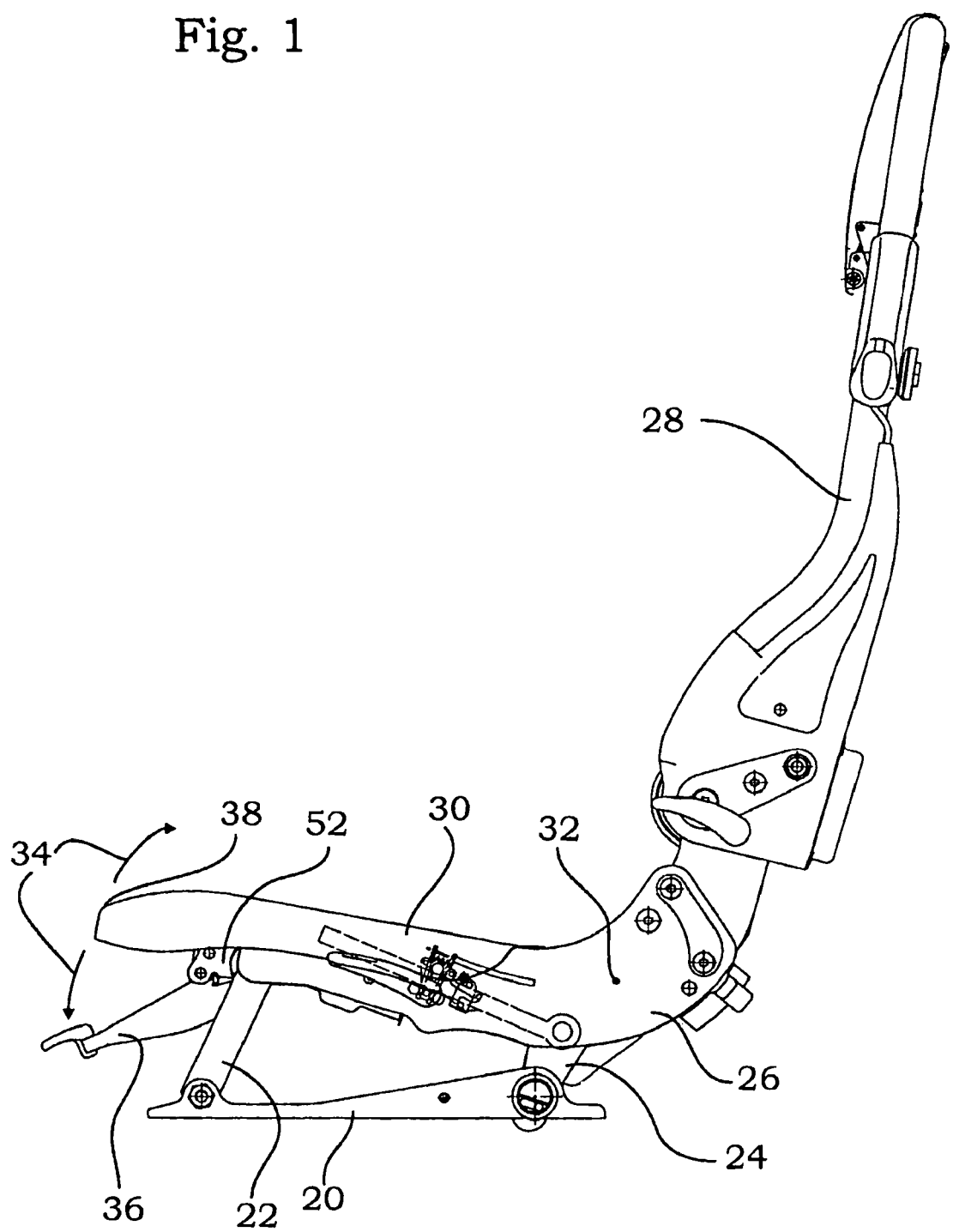

ADJUSTER DEVICE FOR ADJUSTING AND HOLDING A FIRST PART OF A VEHICLE SEAT RELATIVE TO A SECOND PART

The invention refers to a seat adjuster for the adjustment of a first part of a seat of a motor vehicle in relation to a second part, in particular for a height adjustment of a seat front edge of the seat cushion.

A seat of a motor vehicle in accordance with the state of the art is adjustable in various ways, for example the inclination of a seat cushion can be adjusted. This is obtained for example by a vertical adjustment of the seat front edge of the seat cushion.

The state of the art comprises exemplary DE 44 37 539 A1 and DE 102 26 717 A1.

It is the object of the invention to indicate a seat adjuster building relatively simply and being adaptable to different needs and which may show no steps when operated.

This task is solved by a seat adjuster for the adjustment of a first part of a seat of a motor vehicle in relation to a second part of this seat, in particular for a vertical adjustment of a front edge of a seat cushion, with a) an elbow piece, which elbow piece is connected with the first part and has a center as well as a regular front surface, with b) a support piece, which is connected with the second part, is rotatably supported around the center and exhibits a first clamping bevel and a second clamping bevel, these clamping bevels facing in each case the front surface and forming with this front surface a first and a second clamping gap, which gap tapers in each case, with c) a first clamping body, that is arranged between the first clamping bevel and the front surface and a second clamping body, which is arranged between the second clamping bevel and the front surface, with d) two elastical means, of which one is arranged between the first clamping body and the support piece and loads the first clamping body into a clamping position in a first direction of rotation and presses the first clamping body within the corresponding clamping gap into a wedging position, and of which the other one is arranged between the second clamping body and the support piece and loads the second clamping body into a clamping position in a second direction of rotation and presses the second clamping body within the associated clamping gap into a wedging position, and with e) a lever, which is rotatably arranged around the center, which lever normally is in a neutral position and has a first driver and a second driver, the first driver facing the first clamping body without contacting the first clamping body and the second driver facing the second clamping body without contacting the second clamping body, and which lever, starting from the neutral position, is movable into an operating position in each case, in which a driver presses the neighboring clamping body out of the wedging position and thereafter rotates the support piece.

This seat adjuster works after the well known principle of a pinch roll free-wheel. Two clamping arrangements are provided acting in opposite directions, the clamping arrangements in default are in the clamping position and block a movement of the second part in relation to the first part. The lever, when manipulated, allows setting free only one clamping arrangement in each case. Thereafter a rotation is possible in the very direction, in which this clamping arrangement closes. The manipulation in the other direction of rotation remains clamped.

The invention offers the advantage that not only a setting and holding, but also a drive is reached. If the lever, starting from its neutral position, is moved into a first or second direction of rotation, one the drivers of the lever presses the associated clamping arrangement free and in continuation of this movement of the lever the driver contacts the associated driver surface of the support piece, so that from now on the support piece can be driven in the opened direction of rotation. If in this situation a passenger or a motor drive applies force acting between the two parts, e.g. the passenger presses the seat back to the rear, an adjustment takes place. The movement is effected until the very position, which is desired, is reached. If then the lever is released, the rotation of the supporting piece is terminated and the associated clamping arrangement regains the clamping position again, in other words the seat adjuster is blocked again. The lever is always moved in the direction of rotation, in which the adjustment takes place.

The adjustment can be without steps, i.e. stepless, for this the front surface of the elbow piece is configured to be smooth. The front surface can be slightly rough, too. A stepwise adjustment is possible; too, for this the front surface is toothed, for example. In the clamped condition the seat adjuster is free of play, the elastical means pre-stress both clamping arrangements against each other and no play between the first part and the second part exists.

The seat adjuster can be implemented for a limited angular range, which is thus below 360°. In this execution the seat adjuster is for example suitable for the vertical adjustment of the seat front edge. Preferably stops are provided at the ends of the elbow piece, which stops prevent that the support piece leaves the permissible angular range, for which the adjuster is designed.

The seat adjuster can be implemented for an unlimited angular range. In this case the bow extends over 360°.

In the case of an adjustment which is limited in angle, the lever is preferably designed as a simple arm, extending from the center in a radial direction, and has a handle. In case of a non-limited, circular adjustment the lever is preferably implemented as a turning wheel or a handwheel rotatable around the center.

The seat adjuster gets along with two clamping bodies and two clamping bevels. In the state of the art usually six clamping bevels and/or clamping bodies or even more are provided. The invention allows for a simplified construction compared with the pinch roll free-wheels according to the state of the art.

In a preferred embodiment the seat adjuster is mirror-symmetrically implemented, especially the arrangement consisting of the first clamping bevel, the first clamping body and the first driver is mirror-symmetric to the arrangement consisting of the second clamping bevel, the second clamping body and second driver. The plane of symmetry is a radial plane, which runs through the center. In this case the clamping gaps preferably taper outwardly; they become narrower with increasing distance from the mirror plane. It is also possible to configure the clamping gaps tapering in the opposite direction.

In addition, in the seat adjuster according to invention the first part or the second part can be made to move displaced against each other; it is possible, too, that both are movable on same axial line.

Figure 2:
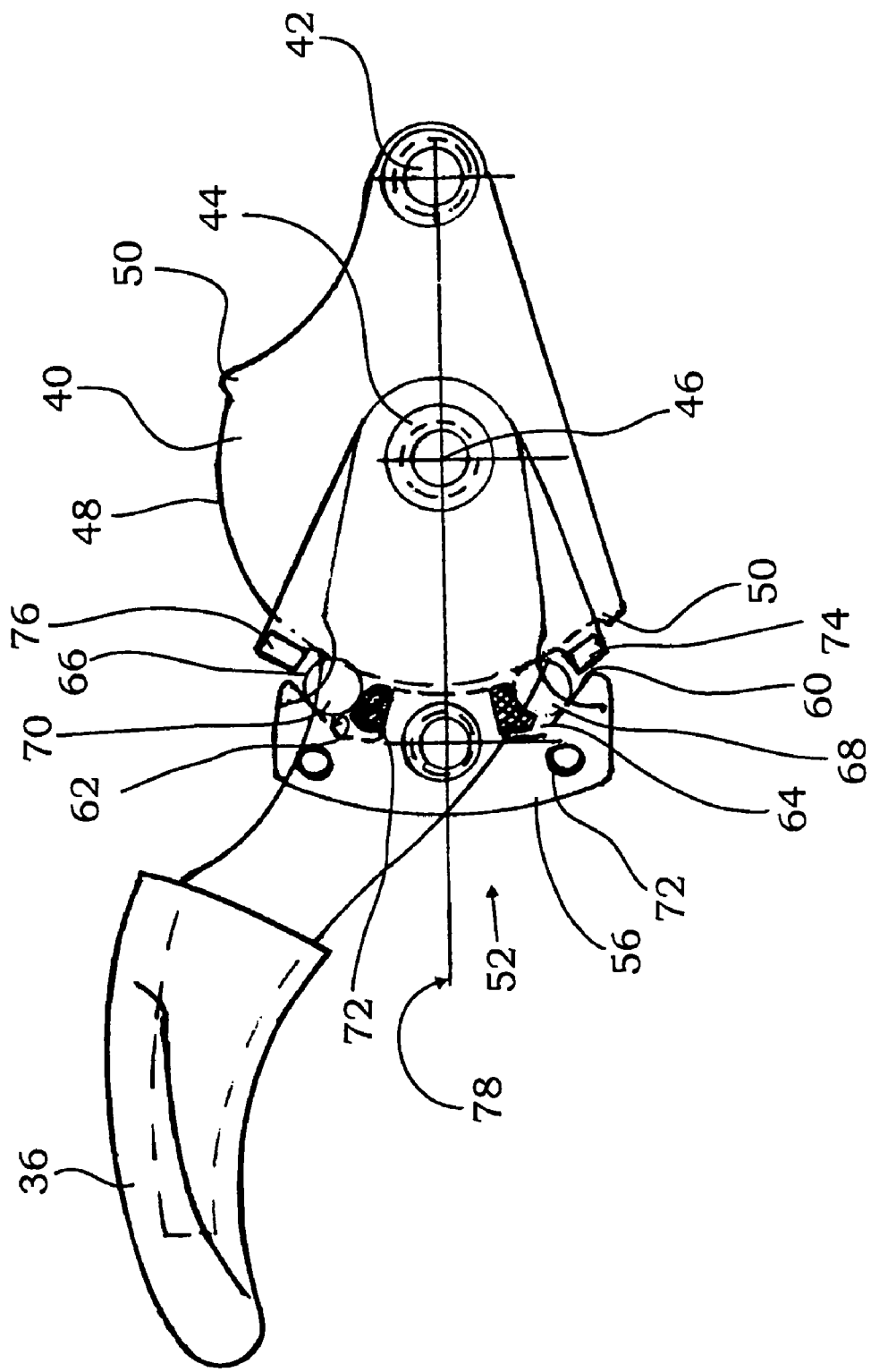
Figure 3:
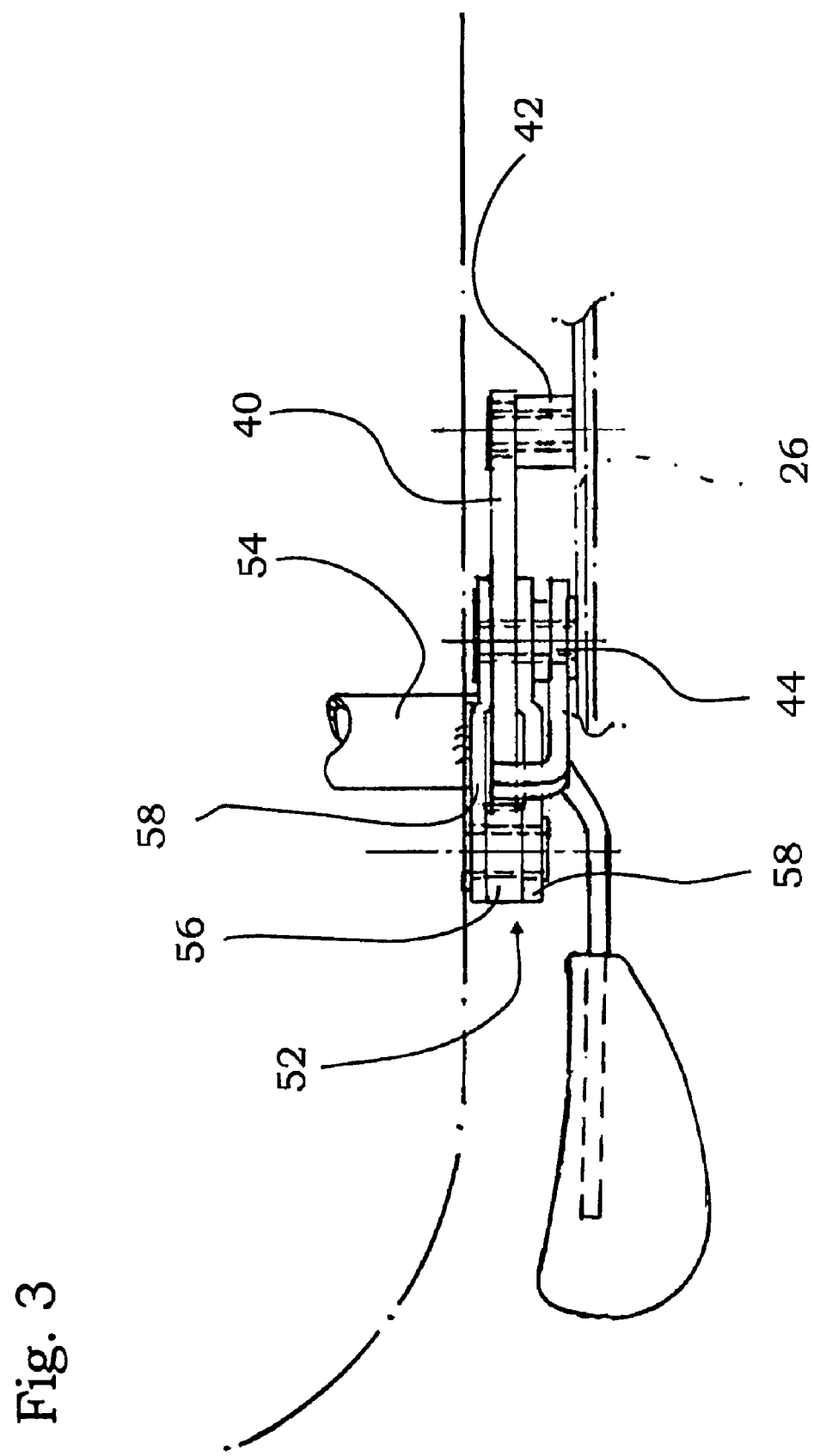
Figure 4:
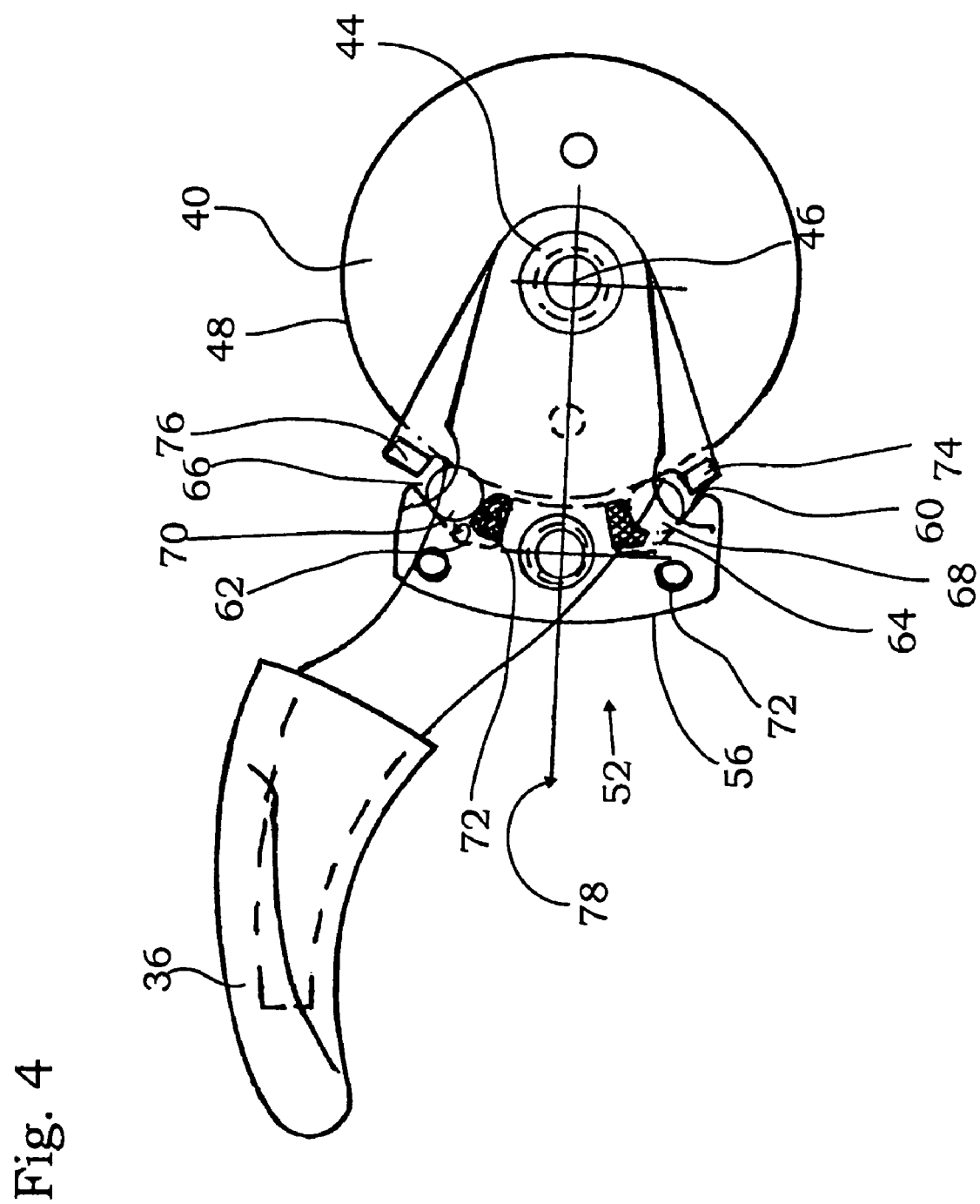
Figure 5:
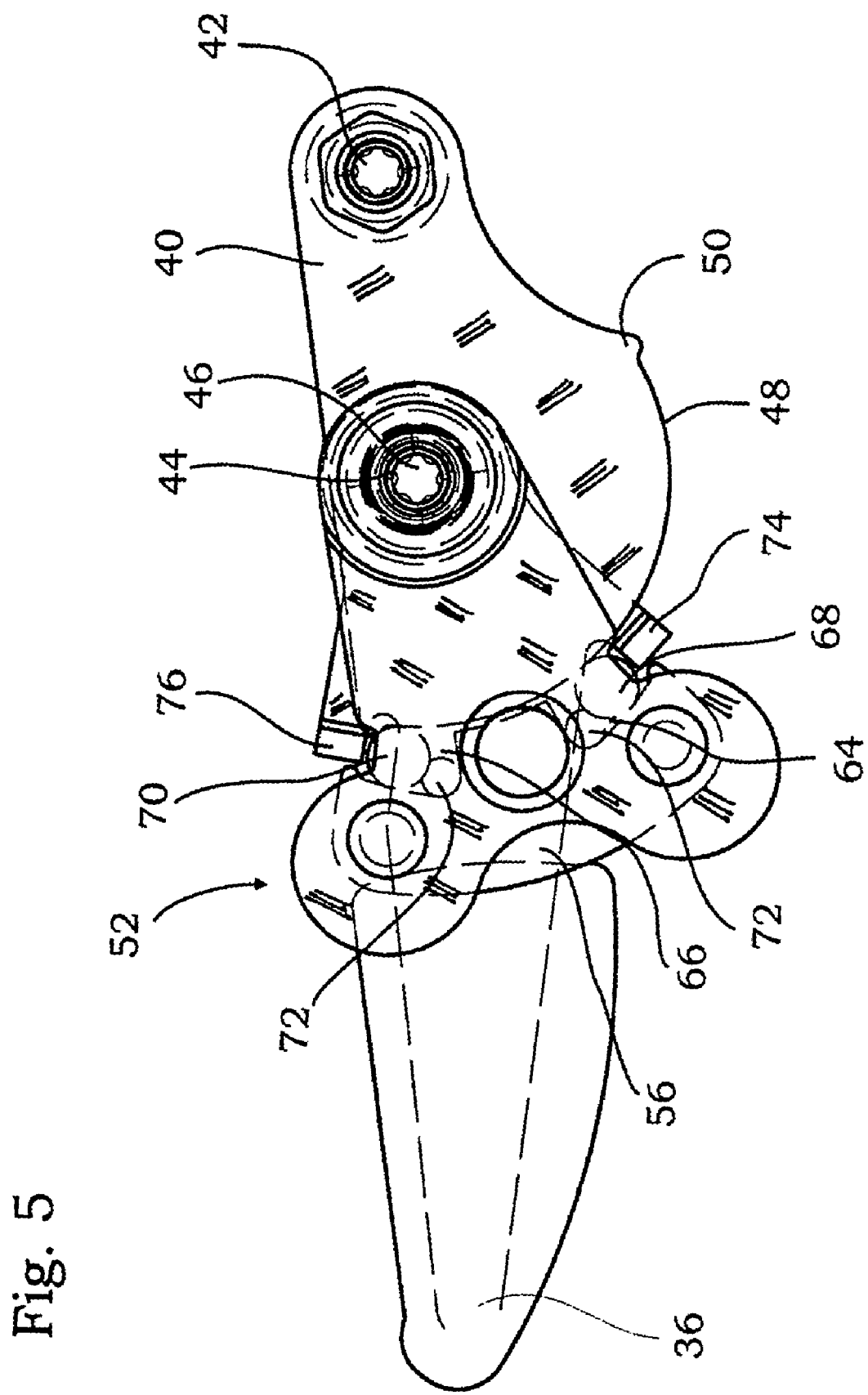
Figure 6:
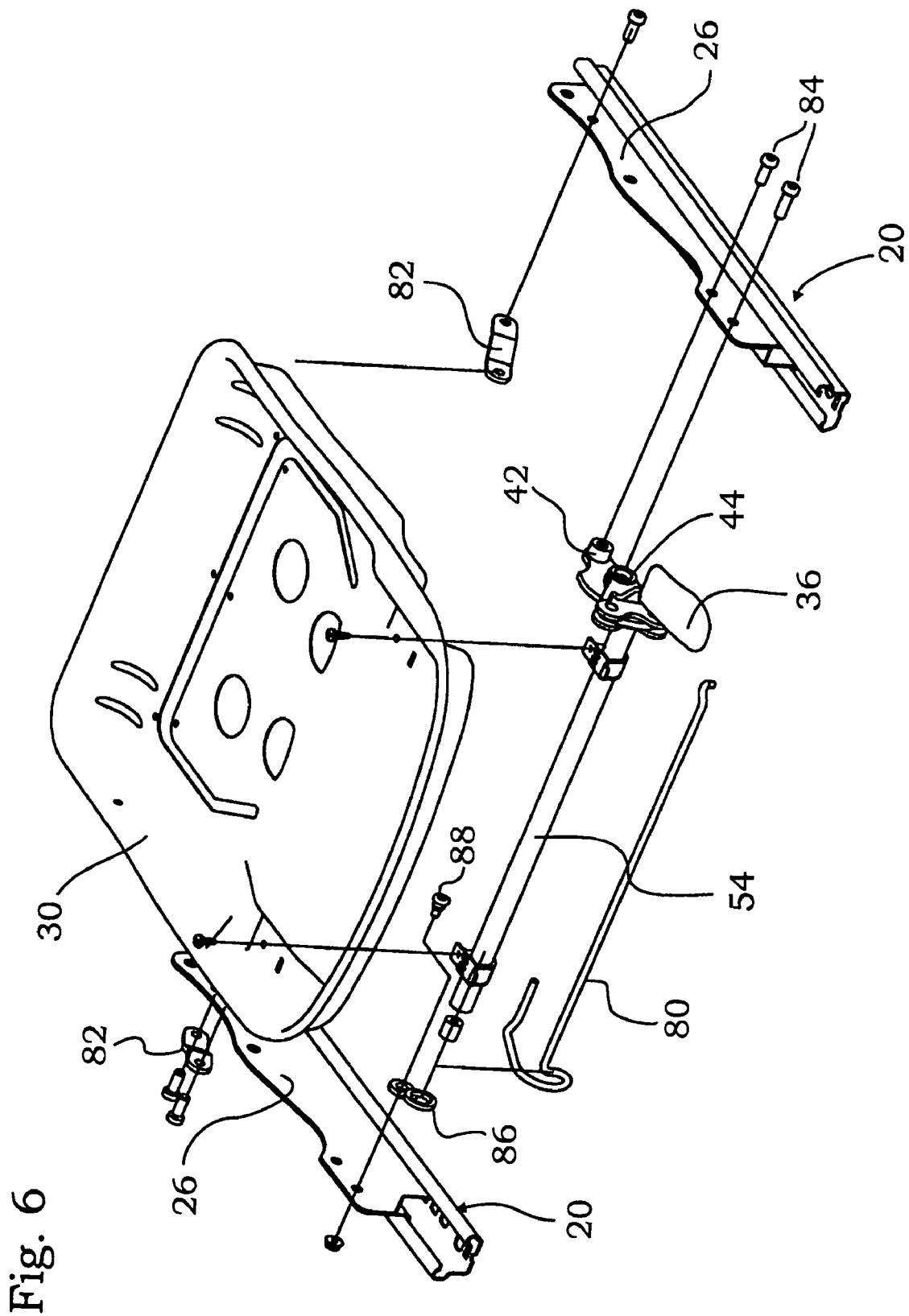

Further advantages and characteristics of the invention will result from the remaining claims as well as the from the following description of three embodiments of the invention which should not be understood as limiting, and which will be more precisely described in the following with reference to the drawing. In this drawing:

FIG. 1: shows a side view in principle of a motor vehicle seat, which is equipped with the seat adjuster according to invention for adjustment of the height of the seat front edge;

FIG. 2: shows a side view in principle of the substantial parts of a first embodiment of the seat adjuster;

FIG. 3: shows a plan view of the arrangement shown in FIG. 2, with an additional side part, FIG. 4: shows a representation of a second embodiment of the seat adjuster, with an elbow piece, which extends over 360°;

FIG. 5: shows a side view of a third embodiment, which is implemented similarly to the first embodiment shown in FIGS. 2 and 3, and FIG. 6: shows a perspective representation in form of an assembly drawing of the substantial parts of a seat.

FIG. 1 shows a motor vehicle seat. It has an underframe, which exhibits a basis 20, a front pair of rockers 22 and a rear pair of rockers 24. This underframe carries a seat section. This has two lateral seat supports 26, a backrest 28 is arranged at these two lateral seat supports 26. A pad carrier 30 is adjustably arranged at the seat supports 26, e.g. linked around a drag axis 32 and tiltable. The pad carrier 30 can be swiveled relative to the seat support 26 in the sense of the double arrow 34. This is reached by a seat adjuster, which is described in the following. This seat adjuster has a lever 36, which essentially is positioned underneath a seat front edge 38. The seat adjuster allows for an adjustment of the pad carrier 30, which forms the second part in the words and sense of the claims, in relation to the seat support 26, which forms the first part.

In the following the first embodiment shown in FIGS. 2 and 3 is described in detail. These figures show an elbow piece of 40 which is firmly connected with the seat support 26. The connection is made by a right pin 42 and a pin 44 lying on an axle 46, which axle runs through the center of the regular front face of the elbow piece delimiting a bow. The front surface 48 extends over for instance 130°. At its ends a stop 50 is provided in each case.

A support piece 52 is provided, it is connected to the pad carrier 30 with a cross beam 54, this cross bar is a part of the pad carrier 30. This support piece 52 is swivellably borne around the axle 46, i.e. it is rotatably carried by pin 44.

In the specific embodiment shown the support piece 52 has a supporting body 56 and two lateral plates 58. The supporting body 56 faces the front surface 48 and is located between the two lateral plates. These also take up the elbow piece of 40 between themselves. The two lateral plates 58 are tiltably arranged at the pin 44. The supporting body 56 forms a first clamping bevel 60 and a second clamping bevel 62. These two clamping bevels 60, 62 face the front surface 48 directly and form with this front surface 48 a first clamping gap 64 and a second clamping gap 66. Both clamping gaps 64, 66 taper, in the embodiment shown they taper outwardly, becoming smaller with increasing distance from the other clamping gap.

A clamping body is arranged in each clamping gap, i.e. a first clamping body 68 is arranged in the first clamping gap and a second clamping body 70 is arranged in the second clamping gap. The clamping bodies are implemented as rollers or balls. Rollers of the type as they are implemented in ball bearings are used.

Two elastical means 72 are provided, of which one is arranged between the first clamping body 68 and the supporting body 56 and of which the other one is arranged between the second clamping body 70 and the supporting body 56. These elastical or flexible means press the neighboring clamping body 68 or 70 into a clamping position. In this the seat adjuster is clamped fixed.

The already mentioned lever 36 which can be rotated around the axle 46, realized by the pin 44, has a first driver 74 and a second driver 76. The lever 36 normally is in its neutral position, in this position it is also shown in all figures. In this neutral position the first driver 74 faces the first clamping body 68 but has no contact with the first clamping body 68, likewise the second driver 76, however, in other direction of rotation, faces the second clamping body 70 but has no contact therewith. If the lever 36 is moved out of the neutral position, one of its drivers 74, 76, depending upon direction of rotation, strikes at one the clamping body 68 or 70. If the lever 36 is rotated in a first direction of rotation and in the embodiment shown is rotated against the clockwise direction, the first driver strikes 74 against the first clamping body 68. The first clamping body 68 is pushed out of the clamping position. The clamping is waived in the adjustment direction against the clockwise direction. The clamping in the other adjustment direction, the clockwise direction, which is caused by the second clamping arrangement, is, however, maintained. When the operation of the lever 36 in the anti-clockwise direction is continued, support piece 52 is driven, too, and an adjustment is effected of the pad carrier 30 relative to the seat support 26. Equivalent procedures happen, if the lever is moved in the clockwise direction, i.e. in the second direction of rotation.

As can be seen from FIG. 2 in particular, the arrangement constituted by first clamping bevel 60, the first clamping body 68 and the first driver 74 is mirror-symmetric to the arrangement constituted by the second clamping bevel 62, the second clamping body 70 and the second driver 76. Mirror plane 78 is a radial plane running through the center. The following parts are identically constructed and made in each case: The two clamping bevels 60, 62, the two clamping bodies 68, 70, the two drivers 74, 76 and the two elastical means 72, i.e. these parts are like parts.

As shown in particular in FIG. 3, the cross beam 54 is misaligned to the axle 46, in any case both do not lie on the same axle. During adjustment the cross beam 54 describes a bow around the axial line of the center 46.

The embodiment of FIG. 4 is somewhat similar to the first embodiment shown in FIGS. 2 and 3; however, the seat adjuster is now rotary. The elbow piece 42 extends over 360° and has no stops. The right pin 42 is not provided and is void. In a preferred embodiment the lever 36 is realized by a handwheel (not represented). Besides this the same parts are used as in the first embodiment. When the handwheel is rotated the cross beam moves on a circular arc around the axial line of center 46. It is also possible to arrange the cross beam on the same axial line as the center 46.

The third embodiment shown in FIG. 5 is implemented again similar to the first embodiment, the adjustment is in an limited angle only, for instance in an angle of 70°. FIG. 5 shows the adjuster from the other side than FIG. 3. Otherwise similar conditions are given and a similar construction is used.

As shown in FIG. 6, a elastical means is arranged between the two parts 26, 30 which can be adjusted, for example a lifting spring 80 is provided, which flexibly preloads the seat front edge 38 relative to the seat support 26, the preload is directed upwards. Thereby the proportionate passenger weight is compensated to a certain extent; the amount of this extent can be specified in the construction. By this the seat adjuster does not need to carry and to lift the entire weight of the legs of a passenger. If the adjuster is adjusted downwards, the adjuster does not fall through downwards until it is completely down, because the weight of the legs. The elastical means provide for compensation, a comfortable adjusting in both directions of the double arrow for 34 is possible.

FIG. 6 shows the seat adjuster of FIG. 5 in a practical application. The basis of the seat is realized by a left and a right pair of rails. The seat tracks have upward extending flanges and form at the same time the seat supports 26. There is provided no front and rear pairs of rockers. The pad carrier 30 is joint-connected in the rear range by swiveling supports 82 with the seat supports 26. The cross beam 54 is connected with the pad carrier 30 by represented means of mounting, the cross piece has drilled holes for this purpose. The cross beam 54 can turn in relation to the pad carrier 30, when moved, however, carries the pad carrier upward and downward. It is represented, too, how the two pins 42, 44 can be fastened to the seat support 26 with the help of screws 84.

FIG. 6 shows that the seat adjuster may only be provided on one seat side, the other seat side is passively adjusted. For this an arm 86 is linked at the other seat side, this arm 86 is tiltable around a pin 88. This arm 86 carries the cross beam 54. The spring 80 is implemented essentially as a torsion bar, it runs through the tubular cross beam 54.

Reference Symbol List 20 basis 22 front pair of rockers 24 rear pair of rockers 26 seat support 28 a backrest 30 pad carrier 32 drag axis 34 double arrow 36 lever 38 front edge 40 curved piece 42 pin 44 pin 46 axle 48 front surface 50 stop 52 support spiece 54 cross beam 56 supporting body 58 lateral plate 60 first clamping bevel 62 second clamping bevel 64 first clamping gap 66 second clamping gap 68 first clamping body 70 second damping body 72 elastic means 74 first driver 76 second driver 78 mirror plane 80 spring 82 swiveling supports 84 screws 86 arm

The invention claimed is:

1. A seat adjuster for the adjustment of a first part of a motor vehicle seat in relation to a second part of the seat, the seat adjuster comprising:
   an elbow piece connected with the first part and having a center as well as a regular front surface,
   a support piece connected with the second part, rotatably supported around the center and defining a first clamping bevel and a second clamping bevel, the clamping bevels facing in each case the front surface and forming with the front surface a first clamping gap and a second clamping gap, wherein the first clamping gap and the second clamping gap taper in each case,
   a first clamping body arranged between the first clamping bevel and the front surface, and a second clamping body arranged between the second clamping bevel and the front surface,
   two elastical means, one of said elastical means is arranged between the first clamping body and the support piece, loads the first clamping body into a clamping position in a first direction of rotation and presses the first clamping body within the first clamping gap into a wedging position, and the other of said elastical means is arranged between the second clamping body and the support piece, loads the second clamping body into a wedging position in a second direction of rotation and presses the second clamping body within the associated clamping gap into a wedging position, and
   a lever, which is rotatably arranged around the center, is normally in a neutral position, and defines a first driver and a second driver, the first driver facing the first clamping body without contacting the first clamping body and the second driver facing the second clamping body without contacting the second clamping body, and said lever, starting from the neutral position, is movable into an operating position in each case, in this operating position a driver presses a respective facing clamping body out of the wedging position and thereafter rotates the support piece.

2. The seat adjuster according to claim 1, wherein the front surface extends over an angle of 360°.

3. The seat adjuster according to claim 1, wherein the front surface extends over an angle of smaller than 360°.

4. The seat adjuster according to claim 1, wherein, in a neutral position of the seat adjuster, an arrangement comprising the first clamping bevel, the first clamping body and the first driver is mirror-symmetric to an arrangement comprising the second clamping bevel (62), the second clamping body and the second driver, the plane of symmetry being a radial plane running through the center.

5. The seat adjuster according to claim 1, wherein the clamping bodies are rollers or balls.

6. The seat adjuster according to claim 1, wherein the two clamping bodies and the two elastical means in each case are identical parts.

7. The seat adjuster according to claim 1, wherein the connection between the support piece and the second part is misaligned in relation to the center.

8. The seat adjuster according to claim 1, wherein the support piece defines a supporting body and two lateral plates, the supporting body is arranged between the lateral plates, the clamping bevels are provided on the supporting body, and the lateral plates are rotatable around the center.

9. The seat adjuster according to claim 1, wherein the support piece defines a supporting body and two lateral plates, the elbow piece is arranged between the two lateral plates, and the clamping bevels are provided on the supporting body.

10. The seat adjuster according to claim 1, wherein the seat adjuster is for a vertical adjustment of a front edge of a seat cushion.

11. The seat adjuster according to claim 1, wherein the elbow piece extends over an angle of 360°, and the connection of the elbow piece with the first part lies on the same axial line as a connection of the support piece and the second part.

12. The seat adjuster according to claim 1, wherein the elbow piece extends over an angle of smaller than 360°, and final stops are provided on the elbow piece.

* * * * *